(12) United States Patent
Buchner et al.

(10) Patent No.: US 9,586,312 B2
(45) Date of Patent: Mar. 7, 2017

(54) UNIVERSAL DRILL STAND

(71) Applicant: ACCELERATED FASTENING LLC, Janesville, WI (US)

(72) Inventors: David J. Buchner, Janesville, WI (US); J. Reed Felton, Wauwatosa, WI (US)

( * ) Notice: Subject to any disclaimer, the term of this patent is extended or adjusted under 35 U.S.C. 154(b) by 85 days.

(21) Appl. No.: 14/679,898

(22) Filed: Apr. 6, 2015

(65) Prior Publication Data
US 2016/0001438 A1    Jan. 7, 2016

Related U.S. Application Data

(63) Continuation-in-part of application No. 13/086,902, filed on Apr. 14, 2011, now abandoned.

(60) Provisional application No. 61/324,630, filed on Apr. 15, 2010.

(51) Int. Cl.
*B25H 1/00*    (2006.01)
*F16M 11/42*   (2006.01)
*F16M 11/24*   (2006.01)

(52) U.S. Cl.
CPC ......... *B25H 1/0035* (2013.01); *B25H 1/0042* (2013.01); *F16M 11/242* (2013.01); *F16M 11/42* (2013.01); *Y10T 408/6757* (2015.01); *Y10T 408/6793* (2015.01); *Y10T 408/94* (2015.01)

(58) Field of Classification Search
CPC ............ Y10T 408/6757; B25H 1/0035; B25H 1/0042; B23Q 9/00; F16M 11/24; F16M 11/26; F16M 11/28; Y10S 408/712
See application file for complete search history.

(56) References Cited

U.S. PATENT DOCUMENTS

| | | | | |
|---|---|---|---|---|
| 4,818,155 A | * | 4/1989 | Belknap | ............... B25H 1/0035 173/36 |
| 4,870,730 A | * | 10/1989 | Belknap | .................. B24B 7/184 173/36 |

FOREIGN PATENT DOCUMENTS

CH    DE 4028972 A1 *  4/1991   ........... B25H 1/0035

* cited by examiner

*Primary Examiner* — Eric A Gates
*Assistant Examiner* — Donte Brown
(74) *Attorney, Agent, or Firm* — Joseph S. Heino

(57) ABSTRACT

A universal drill stand for supporting a hand-held drill in an elevated and inverted position for drilling holes or inserting fasteners into a concrete ceiling or other overhead surface. The universal drill stand is extendable for use with varying ceiling heights. It eliminates the need for a worker to construct scaffolding or ascend a ladder or other elevating device to drill each hole, allowing the worker to remain safely on the floor and away from dust and debris associated with the drilling.

16 Claims, 12 Drawing Sheets

UNIVERSAL DRILL STAND

This application is a continuation-in-part of U.S. patent application Ser. No. 13/086,902 filed Apr. 14, 2011 which claims priority to Provisional Application No. 61/324,630 filed on Apr. 15, 2010. The subject matter of each of those applications is incorporated herein by reference.

FIELD OF THE INVENTION

The present invention relates to the field of drilling of overhead surfaces and more particularly to universal drill stand for supporting a drill in an elevated position.

GLOSSARY

Figure 1:
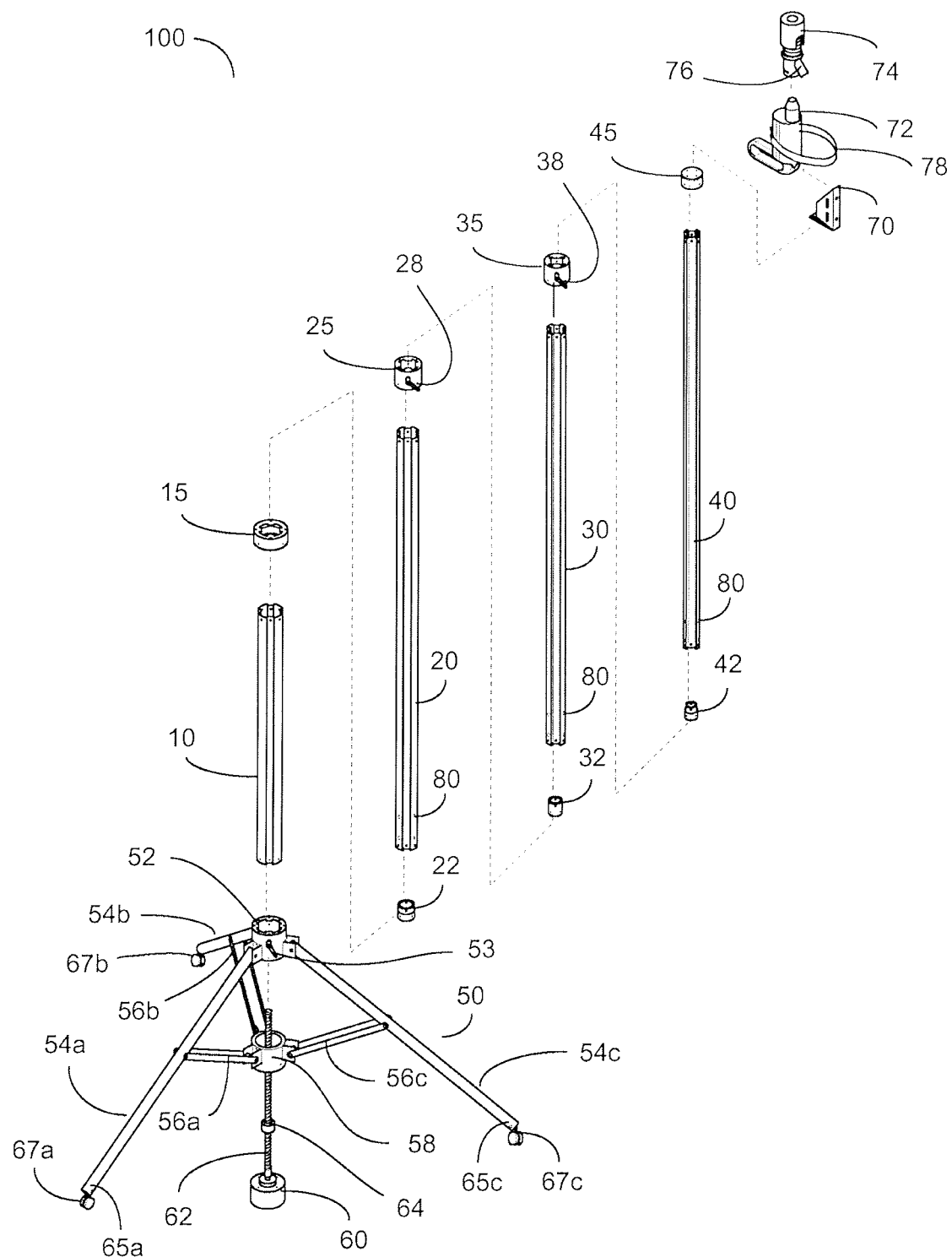
FIG. 1 illustrates an exploded view of a first exemplary embodiment of a universal drill stand.

As used herein, the terms "drill" and "battery drill" mean a power drill operated by use of a DC battery, but could also include a standard corded AC power drill or SDS plus hammer drill of either the battery or corded type.

As used herein, the term "caster" refers to a wheel or any rotatable component that allows a structure to be moved without lifting.

As used herein, the term "friction-reducing surface component" refers to a component secured to a spline which allows the splined tubular components to move more freely in relation to one another. A friction-reducing surface component may include, but is not limited to strips, bearings, buttons, T-shaped components, and coatings.

As used herein, the terms "flat" or "planar" means level, even or without unevenness of surface.

As used herein, the term "selectively" means capable of being attached, detached, or repositioned.

As used herein, the term "spline" refers to a structural configuration which corresponds or mates with another component having a similar shape.

As used herein, the term "splined" means a component having at least one spline.

As used herein, the terms "vertical" or "vertically" mean a structure that is in a position or direction that is perpendicular or substantially perpendicular to the plane of the horizon or other horizontal plane.

BACKGROUND

Before installing fasteners into concrete ceilings for overhead surfaces, it is usually necessary to first drill holes. Holes are typically drilled using a hand-held power drill. This repetitive overhead drilling places a great deal of physical strain on a worker because not only must the worker support the weight of the drill, but apply upwardly drilling force as well.

To reach the overhead surface, the worker must typically construct scaffolding or ascend a ladder or other elevating device to drill each hole. For taller ceilings, a ladder may not reach or because of obstacles may not be able to be placed directly under the surface to be drilled or close enough to the drilling surface, requiring the worker to dangerously overextend to drill the hole. In addition, standing on a ladder or other elevating device positions the worker in close proximity to the dust and debris associated with the drilling of overhead concrete or other surfaces.

Stands for supporting a drill are known in the art. One example is disclosed in U.S. Pat. No. 6,095,724 (Hurt '724). For height adjustment, the stand taught by Hurt '724 uses a lever pivotally connected at a pivot point to a support collar, which is connected to the lower end of an outer column. An inner column is slidably located within the outer column. A linkage pivotally connects the lever to a locking compression collar and locking clamp. To adjust the height of the drill stand, the worker must unlock the locking clamp and then manually slide, in unison, the locking compression collar and locking clamp, the linkage, the support collar and outer column, and the lever upward or downward on the inner column, all while holding the inner column steady by positioning one of his or her feet on a foot plate. When the desired position is reached, the worker must manually lock the locking clamp.

The height adjustment and locking mechanism taught by Hurt '724 is not desirable because it is cumbersome to use. The worker must use both of his or her hands to move all the necessary components and at least one of his or her feet to steady the drill stand. When the selected height is reached, the worker must remove one of his or her hands from the adjustment and locking mechanism components to lock the locking clamp, while supporting all components with the remaining hand. In addition, drill stand taught by Hurt '724 must be picked up and carried from one drilling location to the next.

It is desirable to have a universal drill stand that is not cumbersome to adjust. Ancillary to that functionality would be a power hand tool saddle coupling and saddle base assembly that would be used with the movable stand for supporting and variably elevating at least one power hand tool proximate to an overhead surface for drilling, nailing or cutting into such surface. Such a saddle coupling is disclosed and claimed in this inventor's co-pending U.S. patent application Ser. No. 13/571,617.

It is further desirable to have a universal drill stand that comprises a spring-loaded trigger actuation subassembly and mechanism for actuation of a battery drill that is mounted within the saddle coupling. If a corded drill is used, it would be desirable to provide a control within a user control structure of the drill stand.

It is also desirable to have a universal drill stand that includes a dust collection subassembly or structure for capturing residue that is created during the drilling process.

It is desirable to have a universal drill stand that does not require manual height adjustment.

It is desirable to have a universal drill stand that does not need to be steadied by the worker's foot when adjusted.

It is further desirable to have a universal drill stand which does not need to be carried between drilling locations.

SUMMARY OF THE INVENTION

The present invention is a universal drill stand for drilling holes or inserting fasteners in concrete ceilings or other overhead surfaces.

In a first exemplary embodiment, the universal drill stand is comprised of four tubular extensions; the first tubular extension has the largest diameter with each successive tubular extension having a slightly smaller diameter, allowing the tubular extensions to nest and move slidably inside one another. Each of the tubular extensions has a collar secured around the top end of the tubular extension. The second, third, and fourth tubular extensions may be raised, extending the height of universal drill stand for use with varying ceiling heights. A drill saddle secured to a top cover on the collar on the fourth tubular extension supports a hand-held drill. A tripod assembly and a drive motor and lead screw assembly are secured near the bottom of the universal drill stand.

In a second exemplary embodiment, the universal drill stand is comprised of two tubular extensions. The first tubular extension being vertically movable via a piston rod. A second tubular extension is a movable offset assembly that is secured to the first tubular extension. When coupled with a pneumatic power source, the gaseous medium is channeled first through the valve to the bottom end cap of the pneumatic cylinder to effect the upward vertical movement of the outer tube. The direction of the cylinder is reversed by the pneumatic valve. This is effected by the gaseous medium being channeled from a pneumatic line from the valve affixed to the bottom end cap through the continuous integral channel of the wash-down pneumatic cylinder. This is accomplished via a vented fastener connected to a pneumatic line. This fastener acts to secure the wash down cylinder to the bottom end cap and enables the flow of gaseous medium upward to the cylinder top cap where it energizes the cylinder to travel in a downward vertical fashion. Utilizing the internal channel of the wash-down tube to effect the downward motion of the cylinder precludes the use of additional pneumatic lines that would be otherwise difficult to route and skillfully manage. That is, the piston rod of the pneumatic cylinder is coupled to an outer telescoping tube concentric to the vertical axis of the pneumatic cylinder. The outer telescoping tube is stabilized by a friction reducing bearing affixed to the top cap of the cylinder and a friction reducing bearing affixed to the lowermost portion of the inner circumference of the outer telescoping tube. The outer tube is restricted from rotating about the pneumatic cylinder since four extruded lobes integral to the pneumatic cylinder tube are engaged on either side by the contours of the lower most bearing affixed to the outer tube. In this way, the first tubular extension may be raised, extending the height of universal drill stand for use with varying ceiling heights. A drill saddle is used as is a spring-loaded trigger actuation mechanism for actuation of a battery drill that is mounted within the saddle coupling. A dust collection structure is also provided for capturing residue that is created during the drilling process.

The foregoing and other features of the present invention will be apparent from the detailed description that follows.

DETAILED DESCRIPTION OF INVENTION

For the purpose of promoting an understanding of the present invention, references are made in the text to exemplary embodiments of a universal drill stand, only some of which are described herein. It should be understood that no limitations on the scope of the invention are intended by describing these exemplary embodiments. One of ordinary skill in the art will readily appreciate that alternate but functionally equivalent components, dimensions, and materials may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates an exploded view of an exemplary embodiment of universal drill stand 100. Universal drill stand 100 is comprised of four tubular extensions: first tubular extension 10, second tubular extension 20, third tubular extension 30, and fourth tubular extension 40. First tubular extension 10 has the largest diameter with each successive tubular extension having a slightly smaller diameter which allows tubular extensions 10, 20, 30, 40 to nest and move slidably inside each other.

In the embodiment shown, tubular extensions 10, 20, 30, 40 are approximately 0.625 inches thick, with first tubular extension 10 having a length of approximately 50 inches and second, third, and fourth tubular extensions 20, 30, 40 having a length of approximately 60 inches. In various embodiments, the thickness and lengths of the tubular extensions may vary. For example, the thickness of tubular extensions 10, 20, 30, 40 may range from 0.030 to 0.125 inches. In still other embodiments, the number of tubular extensions may vary. For example, universal drill stand 100 may be comprised of only two tubular extensions or may have 5 tubular extensions.

In the embodiment shown, first, second, third, and fourth tubular extensions 10, 20, 30, 40 are splined, each having four uniformly positioned splines which run the entire length of tubular extensions 10, 20, 30, 40. The splines of each successive tubular extension get smaller, allowing tubular extensions 10, 20, 30, 40 to nest inside one another (see FIG. 2). The inclusion of splines strengthens the tubular extensions and allows for linear movement, but restricts rotation of the tubular extensions within one another.

In an exemplary embodiment, one or more friction-reducing surface components 80 are secured to the external surface of each spline of tubular extensions 20, 30, 40. In the embodiment shown, friction-reducing surface components 80 are T-shaped components having a round, domed top. The ends of the T-shaped components are inserted into apertures in the center of the splines of the tubular extensions 20, 30, 40 until the round, domed top, which is larger than the aperture, is flat against the outer spline surface. The T-shaped components act as spacers between the tubular extensions, ensuring unrestricted linear movement of the tubular extensions and allowing any debris that gets into the tubular extension to drop through the tubular extension, preventing the debris from restricting sliding of the tubular extensions.

Figure 10:
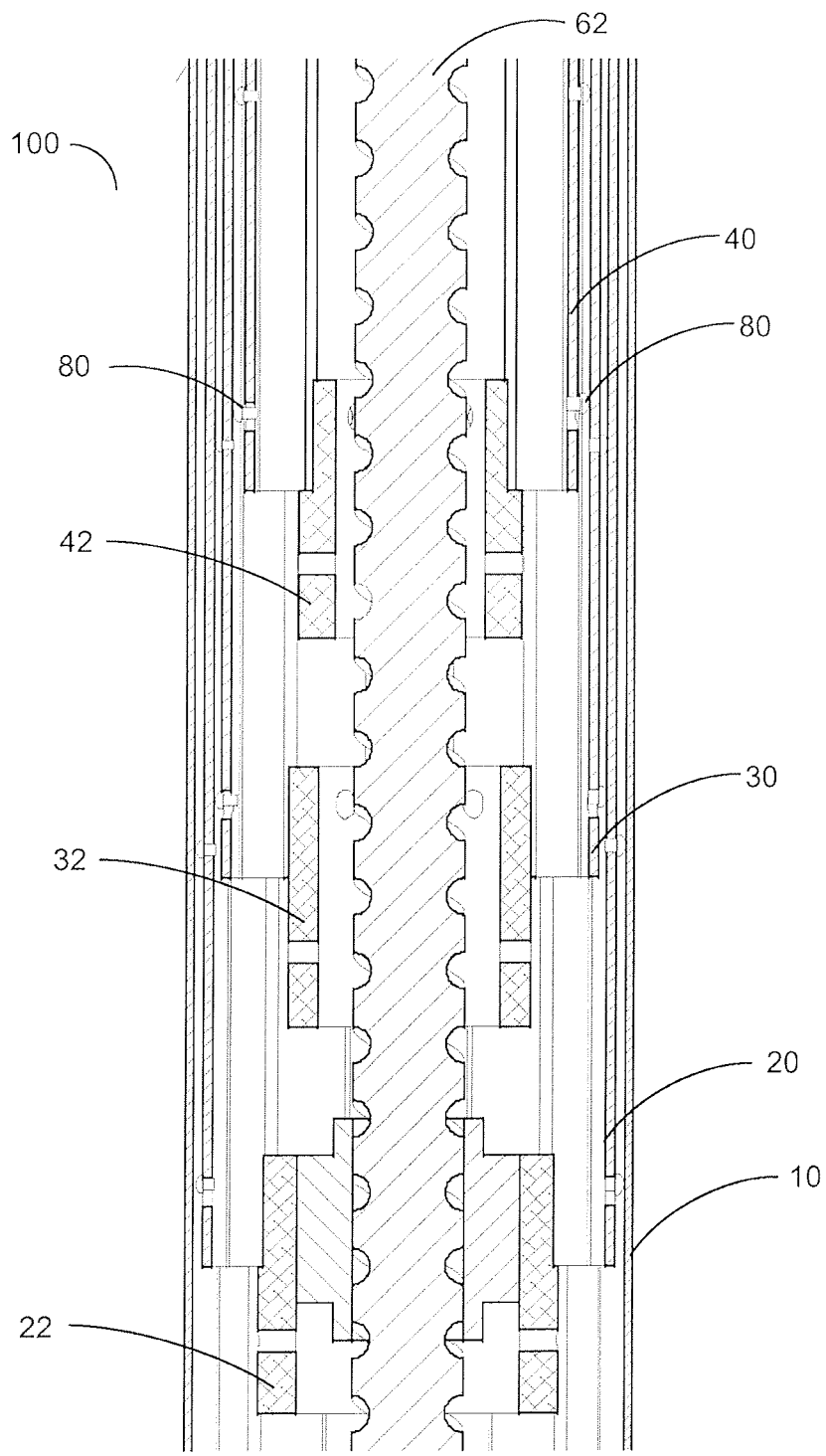
FIG. 10 illustrates a sectional view showing the tubular extensions of the first exemplary embodiment nested.

In an exemplary embodiment, two T-shaped components would be inserted into the center of each spline of tubular extensions 20, 30, 40; one approximately 0.5 inches from the bottom, the second approximately 7 inches from the bottom (see FIG. 10). In an exemplary embodiment, when tubular extensions 20, 30, 40 are fully extended, approximately 8 inches of overlap remains between successive tubular extensions. In various other embodiments, the number of inches of overlap when tubular extensions are fully extended may vary.

In an exemplary embodiment, friction-reducing surface components 80 are comprised of nylon; however, in other embodiments, may be comprised of another type of plastic or friction-reducing material. In various other embodiments, friction-reducing surface components 80 may have another shape (e.g., elongated strips) or may be a coating applied to the external surface of the splines.

Secured to the top of each tubular extension 10, 20, 30, 40 is tubular extension collar 15, 25, 35, 45, respectively. In an exemplary embodiment, tubular extension collars 15, 25, 35, 45 are secured by inserting fasteners through apertures in the collar and into apertures in tubular extensions 10, 20, 30, 40. Tubular extension collars 15, 25, 35, 45 maintain the spacing between the tubular extensions, allowing for free linear movement, as well as prevent tubular extensions from being completely separated one another.

Secured to the top of tubular extension collars 15, 25, 35 is a cover, approximately 0.125 inches thick, shaped to fit around the shape of tubular extensions 10, 20, 30, 40. Secured to the top of tubular extension collar 45 is a flat cover, approximately 0.25 inches thick, for securing drill saddle 70. The covers prevent dust and debris from getting inside the collars.

Each tubular extension collar 15, 25, 35, 45 has a diameter that is slightly larger than the diameter of the corresponding tubular extension 10, 20, 30, 40. In the embodiment shown, tubular extension collar 15 has a height of approximately 1 inch, an inner diameter of approximately 3.02 inches, and an outer diameter of approximately 4 inches. Tubular extension collars 25, 35 have a height of approximately 2.5 inches with an outer diameter of approximately 3.25 and 3 inches, respectively, with the bottom 1.5 inches having a larger inner diameter than the top 1 inch. The bottom of tubular extension collar 25 has an inner diameter of approximately 2.512 inches and the top has an inner diameter of approximately 2.77 inches. The bottom of tubular extension collar 35 has an inner diameter of approximately 2.238 inches and the top has an inner diameter of approximately 2.53 inches. Tubular extension collar 45 has a height of approximately 1.25 inches with an outer diameter of approximately 2.5 inches, with the bottom 0.25 inches having a larger inner diameter than the top 1 inch. The bottom of tubular extension collar 45 has an inner diameter of approximately 2 inches and the top has an inner diameter of approximately 2.238 inches.

In the embodiment shown, second tubular extension collar 25 has clamping lever 28 and third tubular extension collar 35 has clamping lever 38. Clamping levers 28, 38 are used to secure the tubular extensions when universal drill stand 100 is extended. Clamping lever 28 secures second tubular extension 20 to third tubular extension 30 while clamping lever 38 secures third tubular extension 30 to fourth tubular extension 40. In other embodiments, first tubular extension collar 15 may also include a clamping lever.

Second, third, and fourth tubular extensions 20, 30, 40 have tubular extension bottom caps 22, 32, 42, respectively. Bottom caps 22, 32, 42 are secured to the bottom of tubular extensions 20, 30, 40. In the embodiment shown, the top portion of bottom caps 22, 42 has a smaller diameter than the bottom portion, allowing bottom caps 22, 42 to be secured partially inside the bottom of second and fourth tubular extensions 20, 40 while the entire length of bottom cap 32 has the same diameter. Bottom caps 22, 32, 42 provide structural support and a foundation for securing the collar covers. In various other embodiments, bottom caps 22, 32, 42 may be omitted.

Located near the bottom of universal drill stand 100 is tripod assembly 50. Tripod assembly 50 is comprised of leg bracket 52, collapsible leg members 54a, 54b, 54c, brace member pairs 56a, 56b, 56c, and base bracket 58.

Collapsible leg members 54a, 54b, 54c are pivotally connected to leg bracket 52. Brace member pairs 56a, 56b, 56c are pivotally connected to collapsible leg members 54a, 54b, 54c at one end and to base bracket 58 at the other end. Base bracket 58 is fixedly secured to the bottom of first tubular extension 10. In the embodiment shown, collapsible leg members 54a, 54b, 54c are in the deployed position.

In the embodiment shown, collapsible leg members 54a, 54b, 54c are tubular components and brace member pairs 56a, 56b, 56c are comprised of two flattened pieces secured to opposite sides of collapsible leg members 54a, 54b, 54c.

When universal drill stand 100 is assembled, leg bracket 52 encircles first tubular extension 10 and is secured into place by moving leg bracket lever 53 into the locked position. Base bracket 58 is fixedly secured to the bottom of first tubular extension 10.

In the embodiment shown, the bottoms of collapsible leg members 54a, 54b, 54c include aperture pairs 65a, 65b, 65c (65b not visible) (apertures located on opposite sides of collapsible leg members) for rotatably securing casters 67a, 67b, 67c to the bottom of each collapsible leg member 54a, 54b, 54c. Casters 67a, 67b, 67c allow universal drill stand 100 to be more easily moved between the drilling of each hole. In an exemplary embodiment, casters 67a, 67b, 67c include a brake, which allows the casters to be locked when universal drill stand 100 is positioned on an incline.

Also visible in the embodiment shown are drive motor and lead screw assembly 60, drill saddle 70, hand-held drill 72, and drill shroud 74. Drive motor and lead screw assembly 60 is secured below base bracket 58 so that lead screw 62 extends into tubular extensions 10, 20, 30, 40 when universal drill stand 100 is unextended (see FIG. 9). Also visible is lead screw nut 64. The drive motor rotates lead screw 62 which rotates lead screw nut 64 up or down, causing second tubular extension 20 to move up or down, driving the movement of third and fourth tubular extensions 30, 40 which are temporarily fixed to second tubular extension 20 (using collars 25, 35 and clamping levers 28, 38).

Drill saddle 70 is secured to the top cover of fourth tubular extension collar 45, by inserting fasteners through apertures in the bottom of drill saddle 70 into apertures in the top of collar 45. Hand-held drill 72 rests in drill saddle 70 with drill shroud 74 secured to the end of hand-held drill 70. In the embodiment shown, securing component 78 is used to further secure handle-held drill 72 to drill saddle 70. In the embodiment shown, securing component 76 is a strap with hook-and-loop fasteners which is secured around hand-held drill 72 and drill saddle 70.

In various other embodiments, drill saddle 70 may be secured to fourth tubular extension 40 through another means. For example, drill saddle 70 may be shaped to tightly conform to a specific model of hand-held drill or drill saddle 70 may further include an elongated tubular portion that extends from the bottom of drill saddle 70 and which is inserted directly into fourth tubular extension 40.

Drill shroud 74 fits over the top of hand-held drill 72 and catches dust and debris resulting from the drilling of the overhead surface. In various other embodiments, a bag may be secured to port 76 of drill shroud 74 to collect the debris and prevent it from falling into the components of universal drill stand 100 and on the user.

In the embodiment shown, tubular extensions 10, 20, 30, 40, collars 15, 25, 35, 45, leg bracket 52, collapsible leg members 54a, 54b, 54c, and base bracket 58 are comprised of extruded aluminum; however, in various other embodiments one or more components may be comprised of another type of metal, plastic, or other suitable material known in the art.

Figure 2:
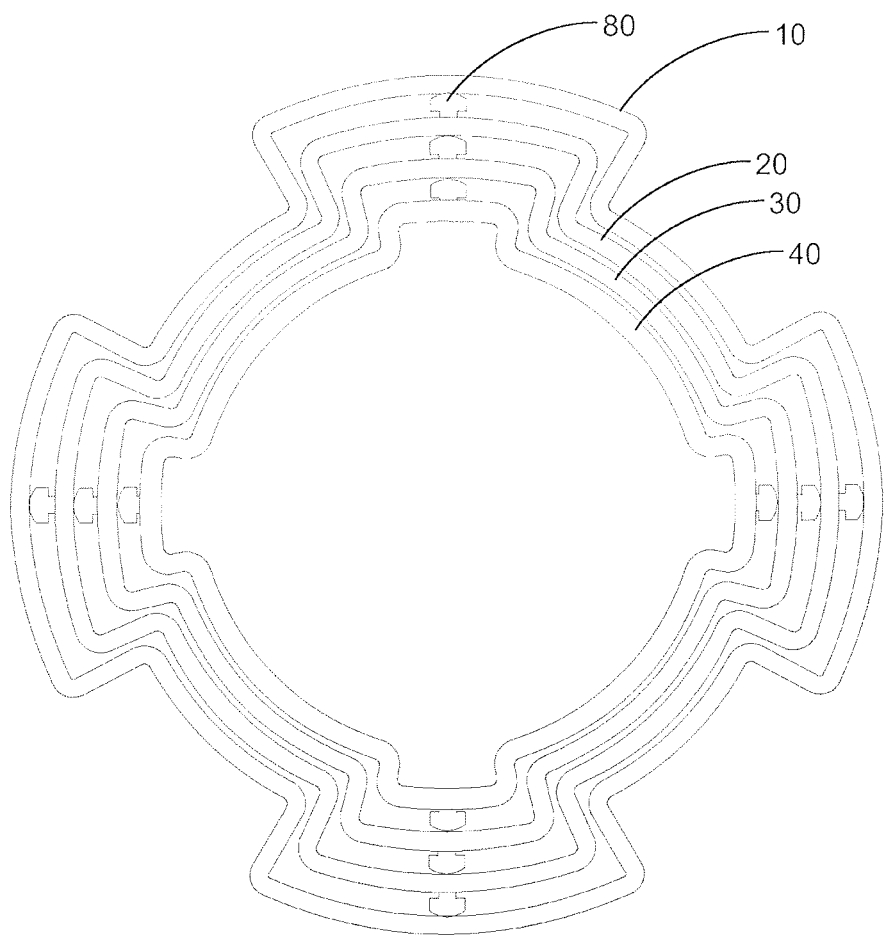
FIG. 2 illustrates a top view of the first exemplary embodiment of tubular extensions nested.

FIG. 2 illustrates a top view of first, second, third, and fourth tubular extensions 10, 20, 30, 40 nested showing the four uniformly positioned splines of each tubular extension. In various embodiments, tubular extensions 10, 20, 30, 40 may include fewer or more uniformly or non-uniformly positioned splines and/or splines of another shape which allow tubular extensions to nest and slide linearly within one another.

In the embodiment shown, first tubular extension 10 has a diameter of approximately 2.77 inches, second tubular extension 20 has a diameter of approximately 2.5 inches, third tubular extension 30 has a diameter of approximately 2.23 inches, and fourth tubular extension 40 has a diameter of approximately 1.9598 inches. In various embodiments, the diameters of tubular extensions 10, 20, 30, 40 may be smaller or larger (e.g., depending on the material used, the length of tubular extensions) and/or the ratio of diameters between successive tubular extensions may vary.

Also visible are friction-reducing surface components 80. In the embodiment shown, friction-reducing surface components 80 are T-shaped components having a round, domed top. The end of friction-reducing surface components 80 are inserted into apertures in tubular extensions 20, 30, 40 and are not visible.

In the embodiment shown, two T-shaped components are inserted into the center of each spline of tubular extensions 20, 30, 40; one approximately 0.5 inches from the bottom, the second approximately 7 inches from the bottom (see FIG. 10). In various other embodiments, fewer or more T-shaped components may be inserted into the splines of tubular extensions 20, 30, 40 and/or the placement of the T-shaped components may vary.

Figure 3:
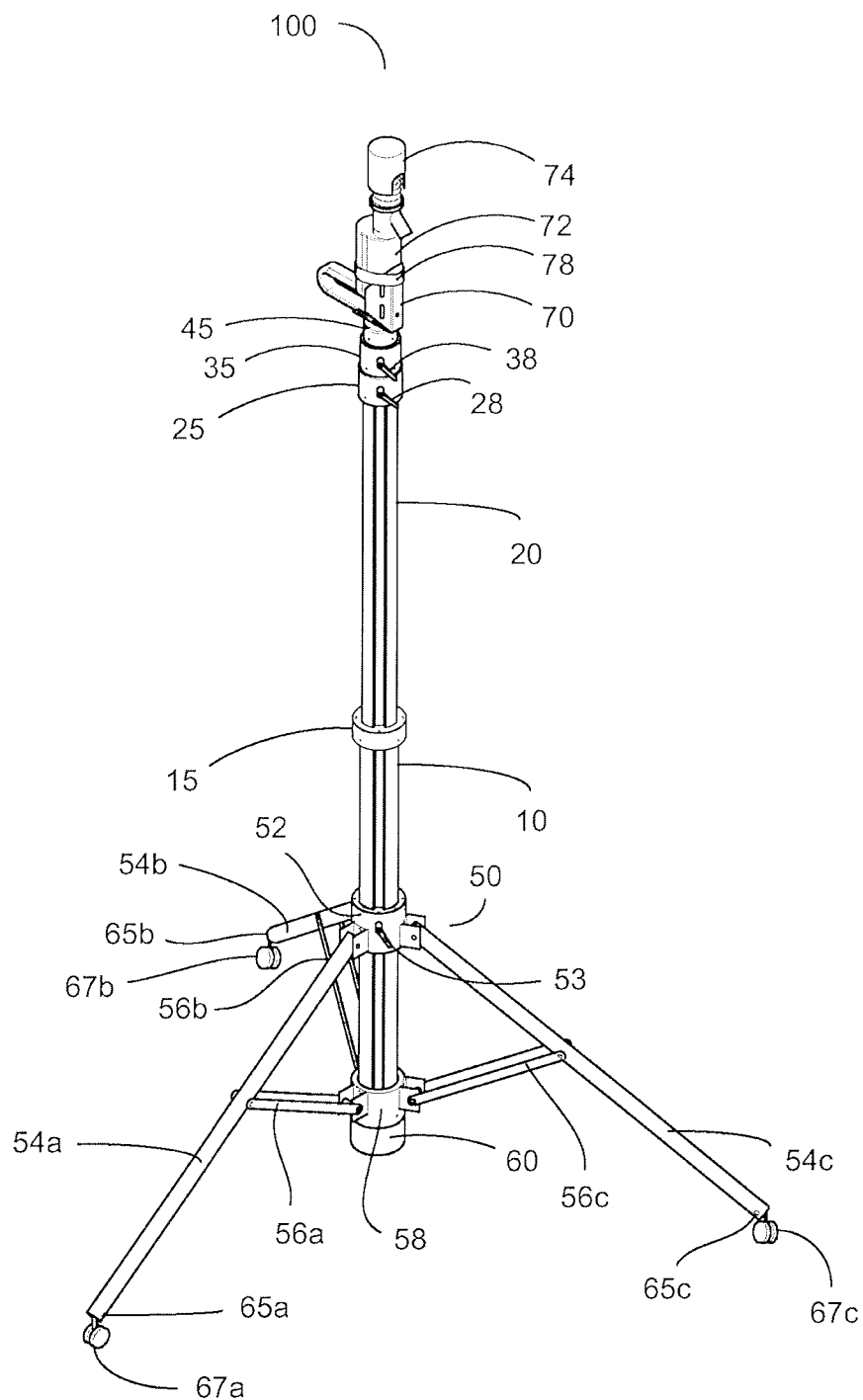
FIG. 3 illustrates a perspective view of the first exemplary embodiment of a universal drill stand in a deployed unextended position.

FIG. 3 illustrates a perspective view of an exemplary embodiment of universal drill stand 100 in a deployed unextended position. Only first and second tubular extensions 10, 20 are visible when universal drill stand 100 is in the unextended position; second, third, and fourth tubular extension collars 25, 35, 45 are stacked together under drill saddle 70.

When universal drill stand 100 is in a deployed position (unextended or extended), collapsible leg members 54a, 54b, 54c and brace member pairs 56a, 56b, 56c extend outward at an angle, and leg bracket 52 is positioned approximately half way between base bracket 58 and first tubular extension collar 15 with leg bracket lever 53 is the locked position.

In the embodiment shown, universal drill stand 100 is approximately 6 feet tall in the unextended position. In various other embodiments, universal drill stand 100 may be shorter or taller depending on the number of tubular extensions and/or the length of tubular extensions.

Figure 4:
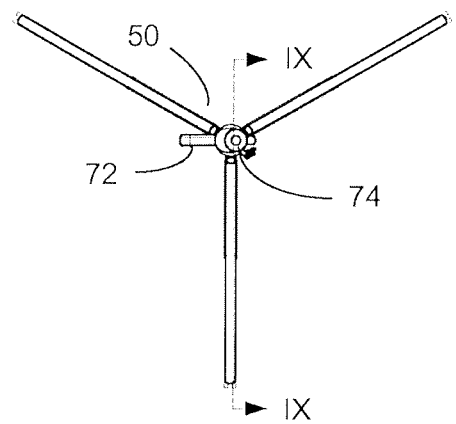
FIG. 4 illustrates a top view of the first exemplary embodiment of a universal drill stand in a deployed unextended position.

FIG. 4 illustrates a top view of an exemplary embodiment of universal drill stand 100 in a deployed unextended position showing the position of collapsible leg members 54a, 54b, 54c when universal drill stand 100 is in the deployed position.

Figure 5:
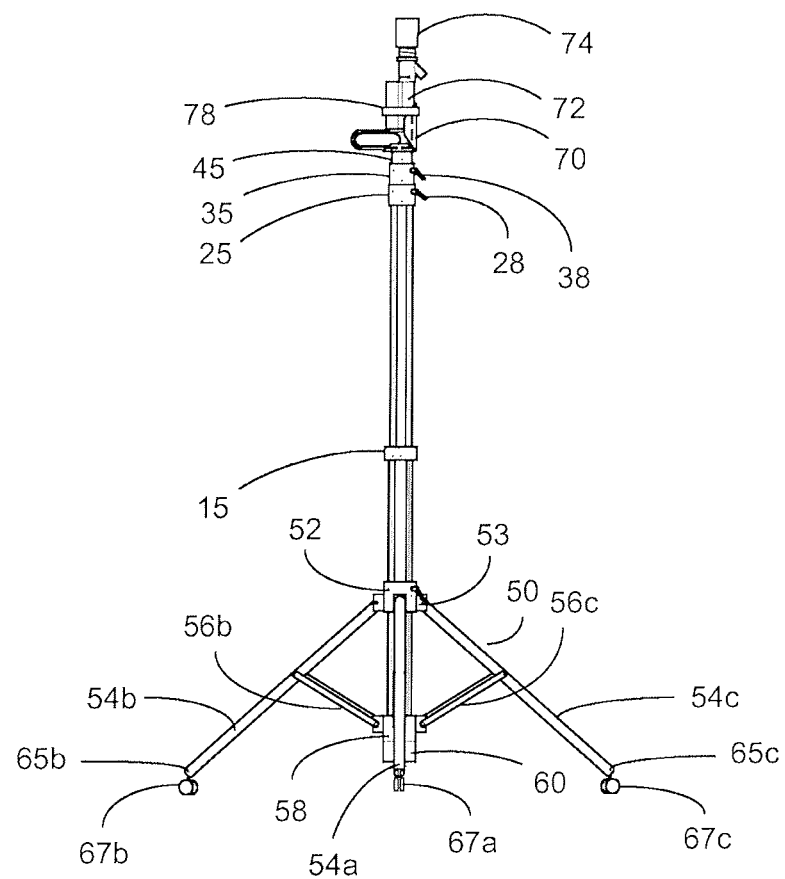
FIG. 5 illustrates a side view of the first exemplary embodiment of a universal drill stand in a deployed unextended position.

FIG. 5 illustrates a side view of an exemplary embodiment of universal drill stand 100 in a deployed unextended position.

Figure 6:
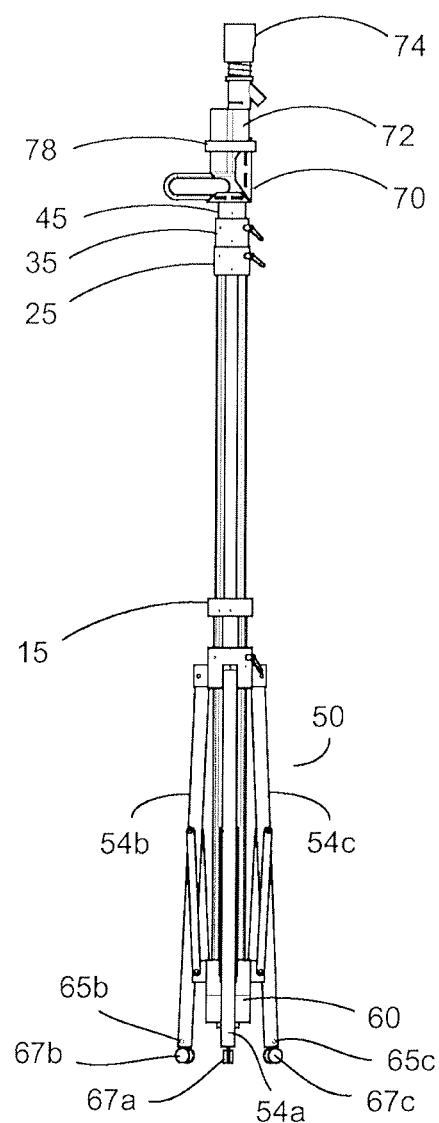
FIG. 6 illustrates a side view of the first exemplary embodiment of a universal drill stand in a stowed position.

FIG. 6 illustrates a side view of an exemplary embodiment of universal drill stand 100 in a stowed position for maneuvering around obstacles, through tight spaces, and for transportation or storage. When universal drill stand 100 is in the stowed position, third and fourth tubular extensions 30, 40 are unextended and second and third tubular extension collars 25, 35 are stacked against fourth tubular extension collar 45.

To move universal drill stand 100 from a deployed position to a stowed position, leg bracket lever 53 is moved from a locked to an unlocked position and collapsible leg members 54a, 54b, 54c and brace member pairs 56a, 56b, 56c are folded inward. When collapsible leg members 54a, 54b, 54c are folded inward, leg bracket 52 slides upward on first tubular extension 10 and closer to first tubular extension collar 15. Leg bracket lever 53 is moved to the locked position to secure leg bracket 52 in position on first tubular extension 10.

Figure 7:
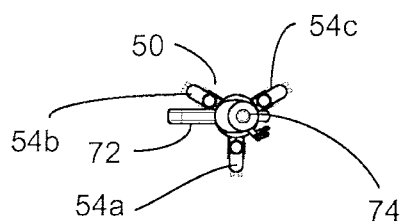
FIG. 7 illustrates a top view of the first exemplary embodiment of a universal drill stand in a stowed position.

FIG. 7 illustrates a top view of an exemplary embodiment of universal drill stand 100 in a stowed position showing the position of collapsible leg members 54a, 54b, 54c when universal drill stand 100 is in the stowed position.

Figure 8:
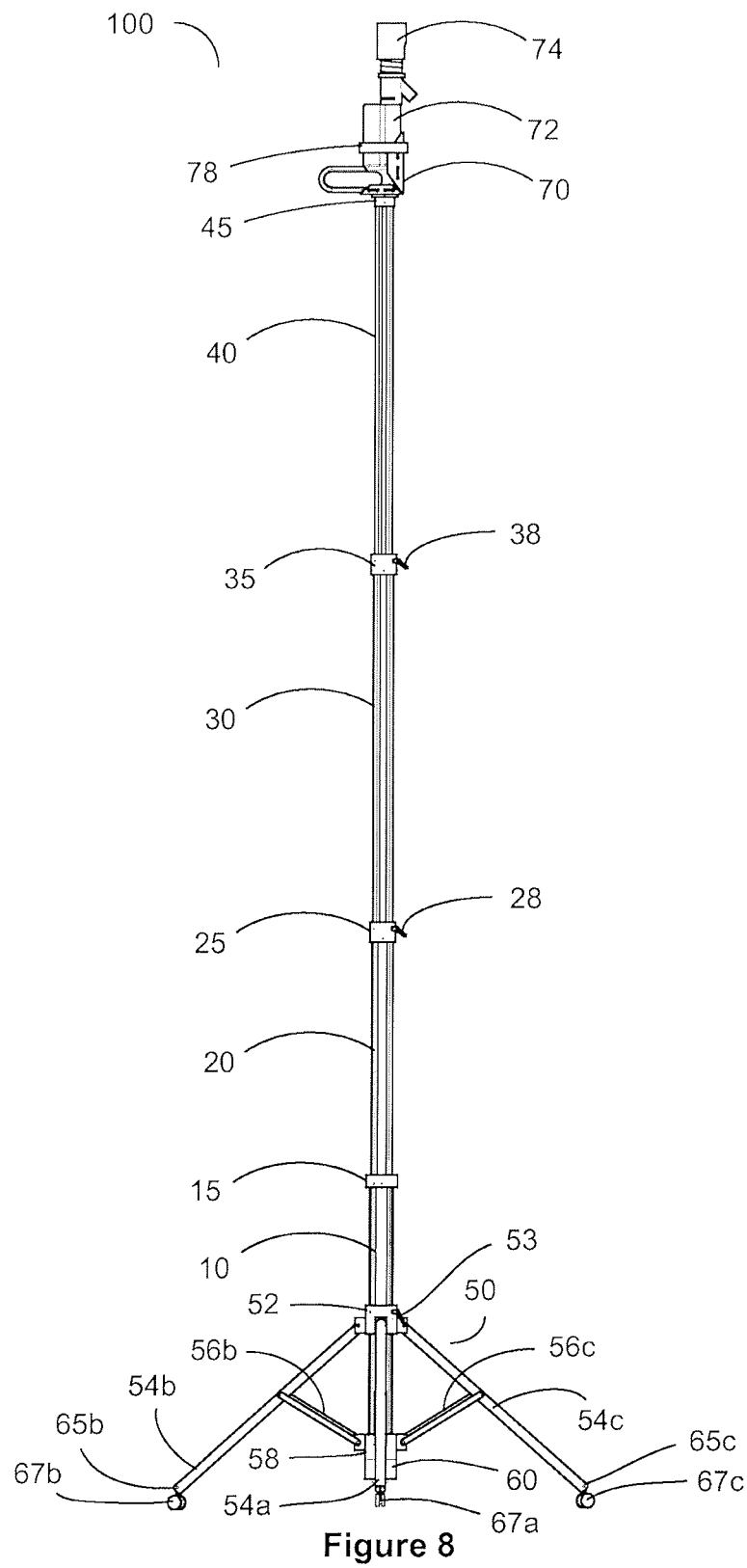
FIG. 8 illustrates a side view of the first exemplary embodiment of a universal drill stand in a deployed extended position.

FIG. 8 illustrates a side view of an exemplary embodiment of universal drill stand 100 in a deployed extended position. To extend universal drill stand 100 to a fully extended position (as shown), third tubular collar lever 38 is moved from a locked to an unlocked position, allowing fourth tubular extension 40 to be removed from its position inside first, second, and third tubular extensions 10, 20, 30 and extended upward. When fourth tubular extension 40 is fully extended, collar lever 38 is moved to the locked position, securing fourth tubular extension 40 to third tubular extension 30. Next, second tubular collar lever 28 is moved from a locked to an unlocked position and third tubular extension 30 is removed from its position inside first and second tubular extensions 10, 20 and extended. When fully extended, collar lever 28 is moved to the locked position, securing third tubular extension 30 to second tubular extension 20. In various embodiments, the height that each of third and fourth tubular extensions 30, 40 are extended depends on the height of the ceiling.

When third and fourth tubular extensions 30, 40 are extended, drive motor and lead screw assembly 60 is used to extend second tubular extension 20. In the embodiment shown, second tubular extension 20 is capable of being raised approximately 3 feet. In various other embodiments, second tubular extension 20 is longer, allowing it to be extended greater than 3 feet.

Universal drill stand 100 is extended until the top of drill shroud 74 rests against the ceiling. In the embodiment shown, universal drill stand 100 is fully extended and has a maximum extended height of approximately 17 feet. In various embodiments, if the desired height is less than 17 feet, one or more of second, third, and fourth tubular extensions 20, 30, 40 may be partially or fully extended to achieve the desired height. In various other embodiments, universal drill stand 100 may have a maximum extended height less than or greater than 17 feet depending on the number and length of tubular extensions.

Figure 9:
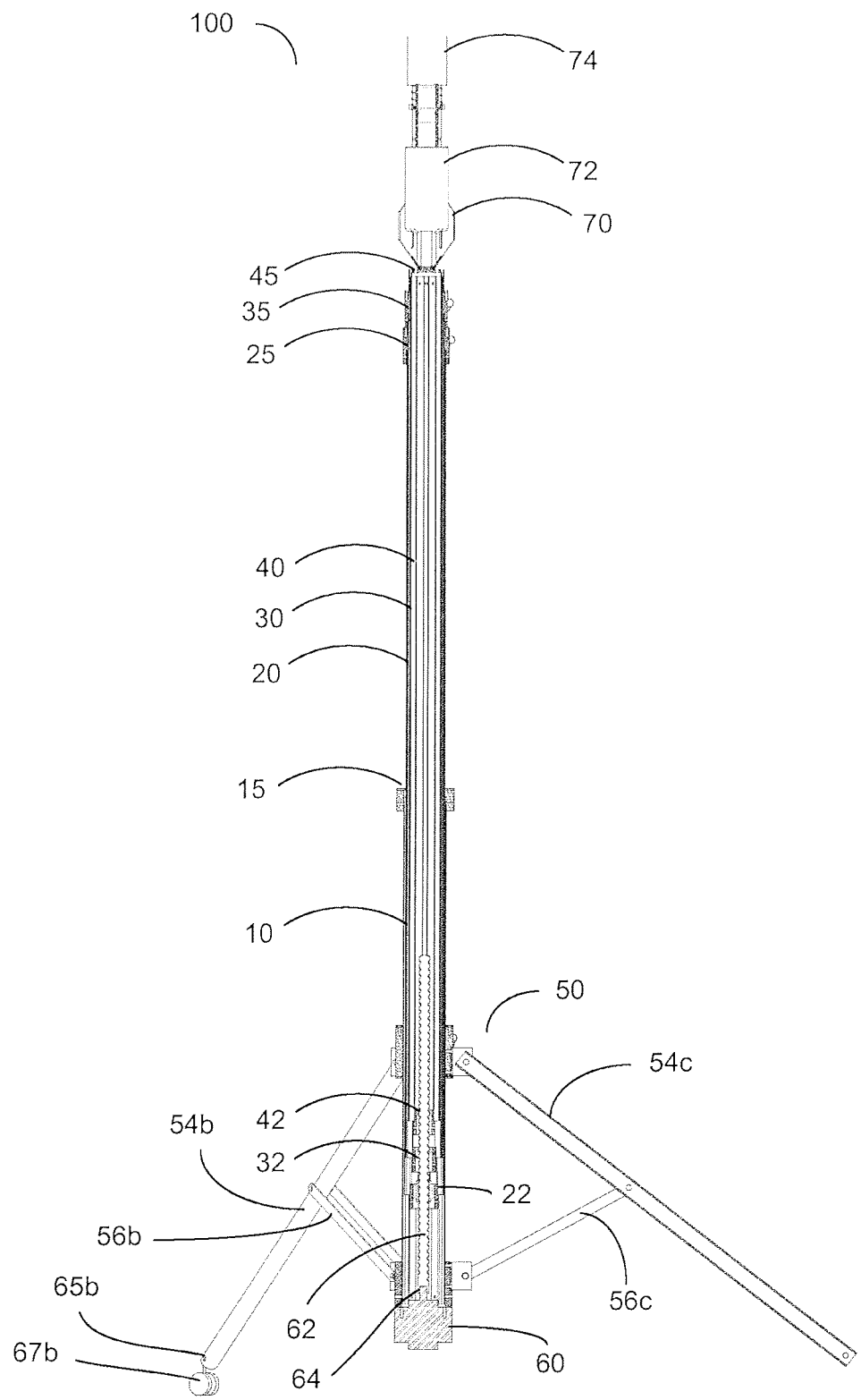
FIG. 9 illustrates a sectional view of the first exemplary embodiment of a universal drill stand in a deployed extended position taken along line IX of FIG. 4.

FIG. 9 illustrates a sectional view of an exemplary embodiment of universal drill stand 100 in a deployed unextended position taken along line IX of FIG. 4. When universal drill stand 100 is in a deployed unextended position, only first and second tubular extensions 10, 20 are exposed with third and fourth tubular extensions 30, 40 positioned inside first and second tubular extensions 10, 20. Second, third, and fourth tubular extension bottom caps 22, 32, 42 are positioned between base bracket 58 and leg bracket 52 when universal drill stand 100 is not extended.

Also visible in the first embodiment shown, are lead screw 62 and lead screw nut. Lead screw 62 extends through bottom caps 22, 32, 42 and into tubular extensions 20, 30, 40.

A controller (e.g., similar to a joystick with up, down and speed controls) is used to control drive motor and lead screw assembly 60 to actuate second tubular extension 20 up and down and to apply pressure to drill shroud 74 (which activates hand-held drill 72) for drilling holes. In various other embodiments, hand-held drill 72 may be actuated using a separate controller (e.g., in the absence of the drill shroud).

In the first embodiment shown, hand-held drill 72 is a drill used to drill holes in concrete ceilings or other overhead surfaces. In various other embodiments, hand-held drill 72 may be used to insert a screw, anchor, or another type of fastener into a concrete ceiling or other overhead surface (e.g., into pre-drilled holes).

FIG. 10 illustrates a sectional view of a portion of tubular extensions 10, 20, 30, 40 nested. Also visible are lead screw 62, bottom caps 22, 32, 42, and friction-reducing surface components 80.

In the first embodiment shown, each spline of tubular extensions 20, 30, 40 has two T-shaped friction-reducing surface components 80; one approximately 0.5 inches from the bottom of tubular extensions 20, 30, 40, the second approximately 7 inches from the bottom of tubular extensions 20, 30, 40. In various other embodiments, fewer or more T-shaped components may be inserted into the splines of tubular extensions 20, 30, 40 and/or the placement of the T-shaped components may vary.

The universal drill stand 100 eliminates the need for a worker to construct scaffolding or ascend a ladder or other elevating device to drill each hole, allowing the worker to safely remain on the floor and away from dust and debris associated with the drilling. In addition, collapsible leg members 54a, 54b, 54c allow universal drill stand 100 to be maneuvered around obstacles and through tight spaces.

Figure 11:
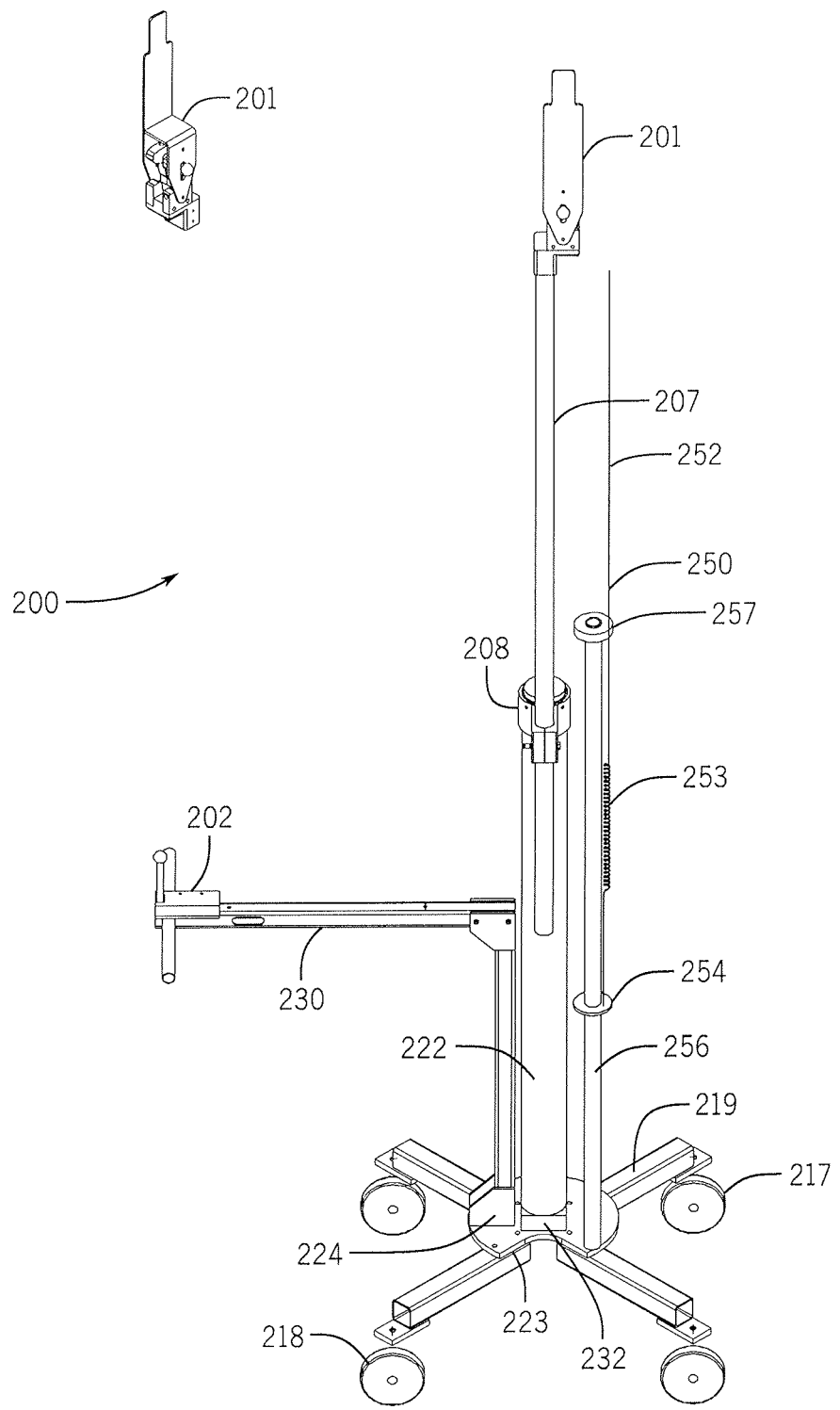
FIG. 11 illustrates a perspective view of a second exemplary embodiment of a universal drill stand.

Referring now to FIG. 11, it illustrates an assembled perspective view of a second embodiment of the universal drill stand, generally identified 200. The drill stand 200 comprises a planar base plate 224 having a gap 223 defined in it. Extending outwardly from the base plate 224 are a plurality of legs 219. In this embodiment, four legs 219 are shown. At the distal end of each leg is a caster 217, 218. Two of the legs 219 have fixed casters 217 attached to them and two of the legs 219 have rotatable casters 218 attached to them. The rotatable casters 218 are rotatable about a vertical axis such that the casters 218 can turn for maneuvering of the drill stand. This configuration allows for easy movement of the drill stand 200 from one location to another and for easy turning and positioning of the stand 200 below a ceiling to be drilled.

Extending upwardly from the base plate 224 is a bottom cap 232, a telescoping or upwardly movable outer tube 222 and a stationary inner tube 242. This structure is essentially that of a vertically-oriented wash-down type pneumatic cylinder, the cylinder being powered by compressed air or bottled gases, such as $CO_2$ or nitrogen. See FIGS. 12, 13 and 14. The inner tube 242, which is essentially the piston rod of the pneumatic cylinder, is coupled to the outer telescoping tube 222 and the outer telescoping tube 222 is stabilized by a friction reducing bearing 225 that is affixed to the top cap 234 of the cylinder and a friction reducing bearing (not shown) affixed to the lowermost portion of the inner circumference of the outer telescoping tube 222.

Figure 12:
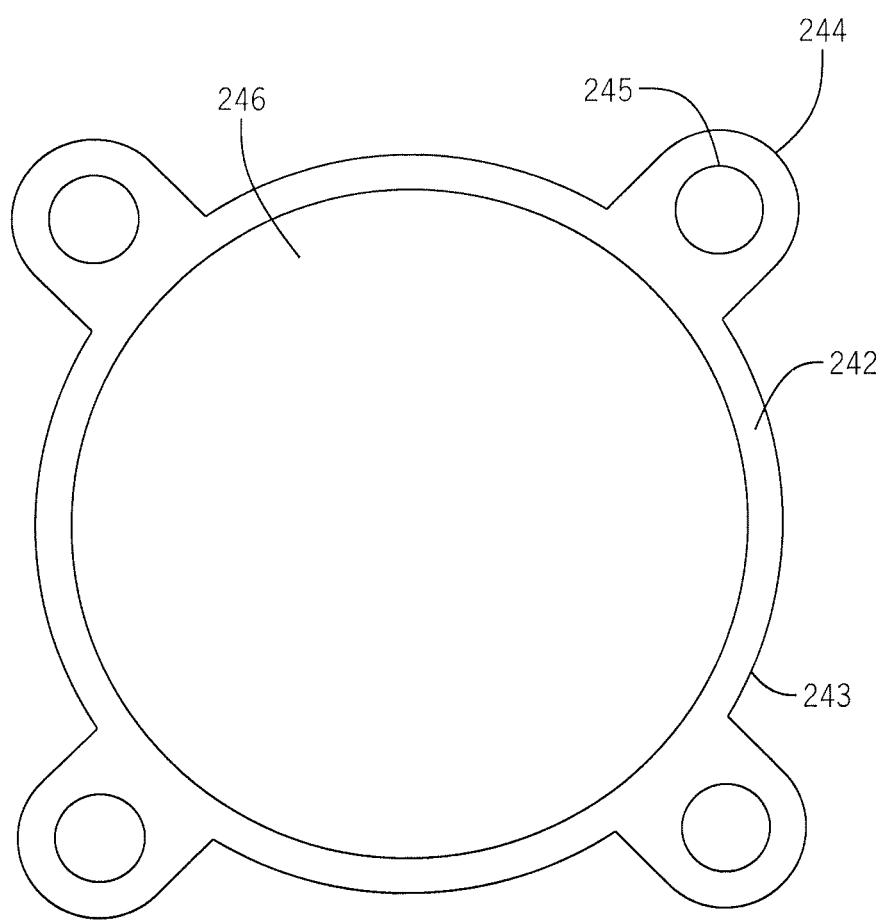
FIG. 12 illustrates a top sectional view of the pneumatic tube profile used in the second embodiment of the universal drill stand.

The pneumatic power system (not shown) of the present invention is comprised of a pneumatic power source, as alluded to above. A control mechanism, such as a 3-way pneumatic valve enables the pressurization of the pneumatic cylinder as well as the exhaust of the pneumatic medium. The pneumatic medium delivery system is comprised of tubes or integral channels controlled by the pneumatic valve. Referring specifically to FIG. 12, it shows a cross section of the inner tube 242 referenced above. The inner tube 242 has an outer profile with a plurality of lobes 244 disposed about the outer perimeter 243 of the inner tube 242. It is to be understood that each "lobe" 244 is actually a longitudinally-extending rib running the length of the inner tube 242. The inner profile of the bearings 225 of the outer telescoping tube 222 matches that profile or contour. In this way, the outer tube 222 is also restricted from rotation.

Figure 13:
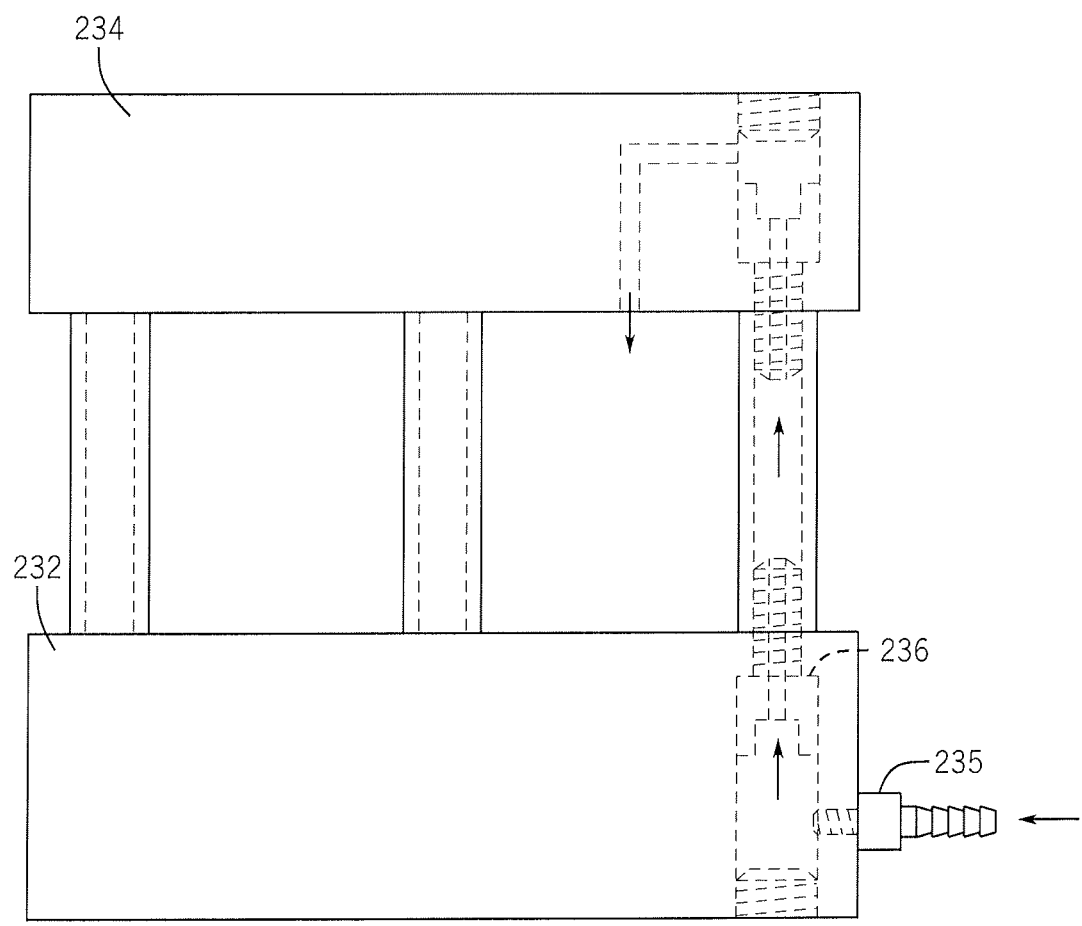
FIG. 13 illustrates a partial side elevational and sectional view of the pneumatic flow configuration used in the stationary tube of the second embodiment of the universal drill stand.
Figure 14:
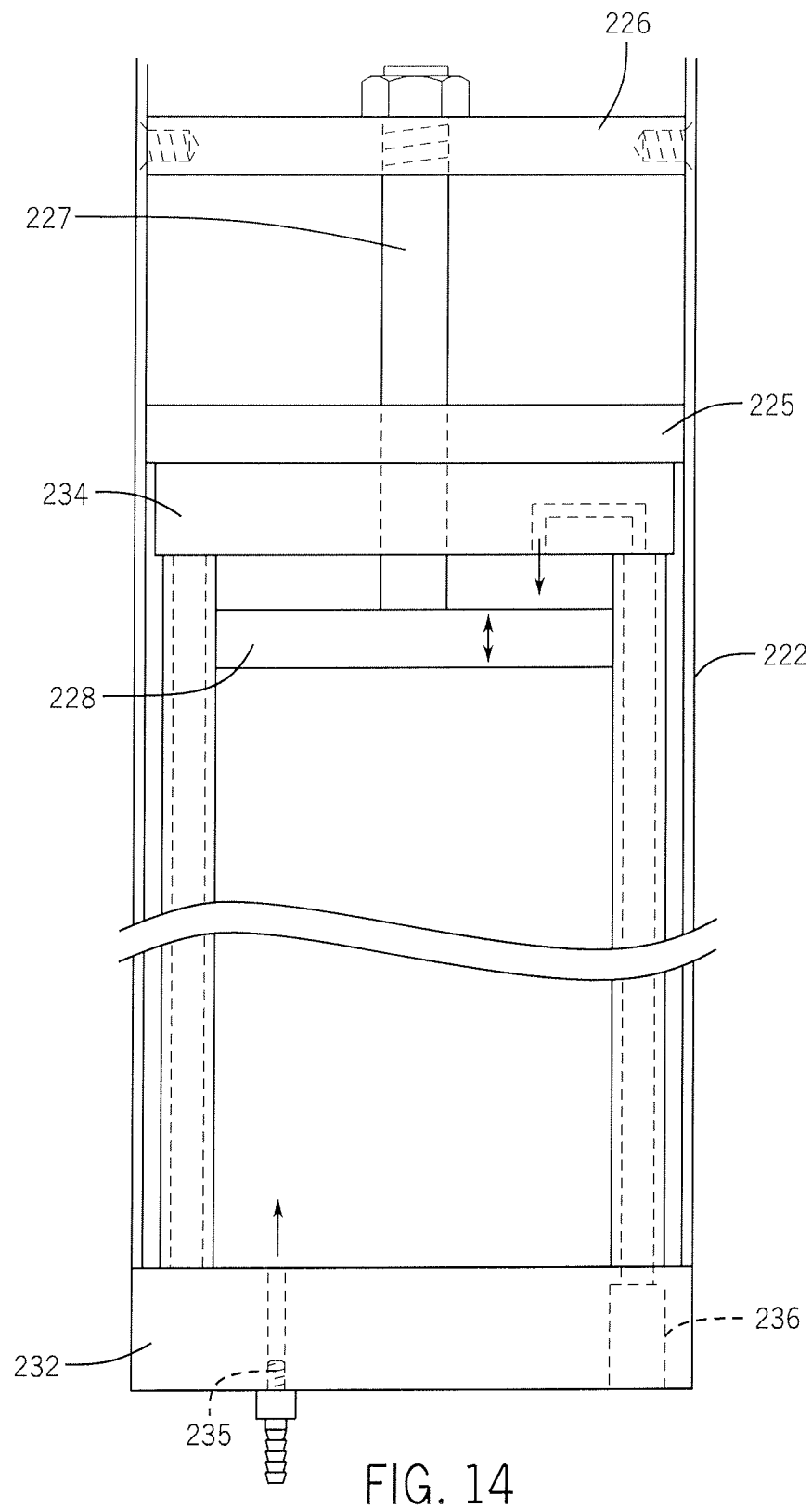
FIG. 14 illustrates a partial side elevational and sectional view of the pneumatic flow configuration used in the stationary and movable tubes of the second embodiment of the universal drill stand.

Further, each lobe 244 comprises an internal and longitudinally-extending aperture 245. The inner tube 242 also comprises an inner cavity 246. Referring to FIG. 13, it shows how the inner tube 242 is used to receive air through an air flow inlet 235 that is defined within the bottom end cap 232. Air passes through the aperture 245 and into the top end cap 242. From there, air fills a cavity 246 of the inner tube 242 above a piston 228 that is attached, in turn, to a piston rod 227 to pneumatically push the attachment disk 226 and the outer tube 222 upwardly. See FIG. 14. That is, when coupled with a pneumatic power source, the gaseous medium is channeled first through the valve to the bottom end cap 232 of the pneumatic cylinder to effect the upward vertical movement of the piston 228 and the outer tube 222.

The direction of the cylinder is reversed by the gaseous medium being channeled from a pneumatic line from the valve affixed to the bottom end cap 232 through the continuous integral channel of the wash-down pneumatic cylinder. This reversal is accomplished via a vented fastener connected to a pneumatic line. This fastener 236 acts to secure the wash down cylinder to the bottom end cap 232 and enables the flow of gaseous medium upward to the cylinder top cap 234 where it energizes the cylinder and allows the piston 228 to travel in a downward vertical fashion. Utilizing the internal channel of the wash-down tube to effect the downward motion of the cylinder precludes the use of additional pneumatic lines that would be otherwise difficult to route and skillfully manage.

A control 202 is attached to a handle 230, the handle 230 being that part of the drill stand 200 that is used to move the drill stand 200 and to actuate elevation of the drill saddle 201. Where a corded drill is used, the control 202 would provide means for powering the drill. A pole clamp offset 208 is disposed at a top cap 234 and an offset tube 207 is secured within the offset 208. The previously-mentioned gap 223 in the base plate 224 allows the lower end of the offset tube 207 to be extended downwardly and below the plate 224 as may be required from time to time. This structure is provided in view of the fact that the inner and outer tubes 242, 222, respectively, are somewhat limited in their fully-extended height. The offset tube 207 overcomes this limitation. The offset tube 207 is elevated to the desired height and then clamped in position via the pole clamp offset 208.

The universal drill stand 200 can elevate drills well beyond the reach of tradesmen. Corded drills can be turned on and off with the switch on the multi-outlet strip or control 202 attached to the handle, but this does not allow battery drills to be used. Accordingly, a cable trigger subassembly 250 is provided which is comprised of a cable 252, an extension spring 253, an anchoring washer 254 and a utility pole 256 with a retaining ring 257 with embedded magnets (not shown). See FIG. 1. The cable 252 whose first end is attached to the drill saddle in a position to be guided over the drill trigger. The second end of the cable trigger subassembly 250 is attached to the anchoring washer 254 which is slipped over the utility pole 256. Just above the anchoring washer 254 is an extension spring 253. The embedded magnets in the retaining ring 257 allow storage for the anchor washer 254 and for vertical adjustment of the drill stand 200 prior to engaging the cable trigger system. When the drill is extended vertically to within 4-6" of the ceiling, the anchoring washer 254 is separated from the embedded magnets and allowed to slip down the utility pole 256. When the drill is moved upwardly, the anchor washer 254 binds on the utility pole 256 and tension accumulates on the cable 252. The drill trigger actuates when sufficient cable tension occurs and with the extension spring 253 in the cable linkage allows drill actuation over a practical vertical stroke since the spring stretches as the drill advances vertically. When the drill is reversed in direction, the cable tension is relieved and the drill de-actuates.

Dust control, especially of silica-based dust associated with concrete, is becoming an essential safety feature required on larger job sites. The universal drill stand 200 of the present invention can facilitate dust collection in two different ways. For example, Makita currently has an SDS plus battery operated drill with a built in HEPA filtered dust collection. This is accomplished with an integrated retractable dust shroud which recedes as the drill bit penetrates the ceiling. This is very effective at collecting dust but has limitations in that the accurate placement of the drill bit is obscured by the dust shroud.

Accordingly, a preferred dust collection subassembly collects dust by using suction from a common shop vacuum. A solid block with a vertical oriented aperture is attached to the drill saddle to which is adjustably clamped an inner and outer collection tube assembly. The vacuum hose is clamped to the bottom of the outer collection tube and the inner tube is retained in the outer tube with a pin that travels vertically in a slot in the outer tube. The vertical travel of the inner telescoping collection tube is resisted by a compression spring retained at the bottom of the outer tube and bears upon the bottom of the inner telescoping tube. The pin affixed to the telescoping tube limits upward or downward travel by the length of a pin slot in the outer tube. At the top of the inner telescoping collection tube is affixed an additional tube at a right angle to the inner telescoping tube and as a continuous extension of it. This right angle tube is laterally adjustable and terminates with the vacuum site tube, with dual vertically oriented apertures on both ends. The position of the vacuum site tube is laterally adjustable to compensate for small dimensional differences between various drills. The telescoping tube assembly functions to allow the vacuum site tube to retain ceiling contact for various drilling depths via the spring action of the inner telescoping tube so as to effectively create air flow for the vacuum that seals at the ceiling and allows rapid air movement upward into the downward facing aperture of the vacuum site tube to prevent dust generated by drilling from falling through the aperture. The dual aperture of the vacuum site tube surrounds the drill bit while drilling and simultaneously allows clear site lines to the drilling target on the ceiling.

The details of the invention having been disclosed in accordance with the foregoing, I claim:

1. A universal drill stand for use with a drill, the stand comprising:
   a vertical wash-down pneumatic cylinder having an uppermost portion;
   a horizontal base for supporting the vertical cylinder;
   a pole clamp offset disposed at the uppermost portion of the vertical cylinder;
   an offset tube disposed within the pole clamp offset and having an uppermost portion;
   a drill saddle disposed at the uppermost portion of the offset tube; and
   means for actuating the cylinder to elevate the offset tube and drill saddle for drilling a hole into a concrete ceiling or other overhead surface.

2. The universal drill stand of claim 1 further comprising legs extending from the horizontal base and casters disposed at the end of each leg such that the drill stand is movable and maneuverable.

3. The universal drill stand of claim 2 wherein the casters comprise a combination of fixed and rotating casters.

4. The universal drill stand of claim 1 further comprising a cable trigger subassembly for actuating the drill.

5. The universal drill stand of claim 4 wherein the cable trigger subassembly comprises:
   a cable;
   an extension spring;
   an anchoring washer;
   a utility pole; and
   a retaining ring disposed atop the utility pole.

6. The universal drill stand of claim 1 further comprising a dust control subassembly for collecting dust during the drilling of a hole by the drill.

7. A universal drill stand for use with a drill, the stand comprising:
   a movable horizontal base;
   a vertical inner cylinder secured to the base;
   a vertical outer cylinder, the outer cylinder being movable vertically;
   an uppermost portion to the outer cylinder;
   a pole clamp offset disposed at the uppermost portion of the outer cylinder;

an offset tube disposed within the pole clamp offset and having an uppermost portion;

a drill saddle disposed at the uppermost portion of the offset tube; and means for actuating the outer cylinder to elevate the offset tube and drill saddle for drilling a hole into a concrete ceiling or other overhead surface.

8. The universal drill stand of claim 7 further comprising legs extending from the horizontal base and casters disposed at the end of each leg such that the drill stand is movable and maneuverable.

9. The universal drill stand of claim 8 wherein the casters comprise a combination of fixed and rotating casters.

10. The universal drill stand of claim 7 further comprising a cable trigger subassembly for actuating the drill.

11. The universal drill stand of claim 10 wherein the cable trigger subassembly comprises:

a cable;

an extension spring;

an anchoring washer;

a utility pole; and a retaining ring disposed atop the utility pole.

12. The universal drill stand of claim 7 further comprising a dust control subassembly for collecting dust during the drilling of a hole by the drill.

13. The universal drill stand of claim 7 wherein the horizontal base comprises a gap, such gap allowing for the clearance to pass a portion of the offset tube below the base.

14. The universal drill stand of claim 7 wherein the vertical inner cylinder comprises an outer perimeter having a plurality of lobes and the outer cylinder comprises friction reducing bearings which are configured to complement the outer perimeter and plurality of lobes of the vertical inner cylinder.

15. The universal drill stand of claim 7 wherein the vertical inner cylinder further comprises a bottom end cap having a valve such that the channeling of a gaseous medium through the valve effects upward vertical movement of the outer tube.

16. The universal drill stand of claim 15 wherein a vented fastener is affixed to the bottom end cap which enables the flow of gaseous medium upward to a cylinder top cap thereby energizing the outer cylinder to travel in a downward vertical fashion and without the use of additional pneumatic lines.

* * * * *